March 31, 1925.

C. A. B. HALVORSON, JR

Re. 16,031

HEADLIGHT REFLECTOR

Original Filed Jan. 17, 1921 /2 Sheets-Sheet 1

Inventor.
Cromwell A. B. Halvorson Jr
By Jas. H. Churchill
Atty.

March 31, 1925.

C. A. B. HALVORSON, JR

Re. 16,031

HEADLIGHT REFLECTOR

Original Filed Jan. 17, 1921 2 Sheets-Sheet 2

Inventor:
Cromwell A. B. Halvorson Jr
By Jas. H. Schenkel
Atty.

Reissued Mar. 31, 1925. Re. 16,031

UNITED STATES PATENT OFFICE.

CROMWELL A. B. HALVORSON, JR., OF LYNN, MASSACHUSETTS.

HEADLIGHT REFLECTOR.

Original No. 1,394,896, dated October 25, 1921, Serial No. 437,698, filed January 17, 1921. Application for reissue filed November 2, 1923. Serial No. 672,406.

*To all whom it may concern:*

Be it known that I, CROMWELL A. B. HALVORSON, Jr., a citizen of the United States, residing at Lynn, county of Essex, State of Massachusetts, have invented certain new and useful Improvements in Headlight Reflectors, of which the following is a specification.

My invention has reference to reflectors for "anti-glare" lighting units and has for its object the provision of an improved device of this character. More specifically, my invention relates to reflectors designed to produce an illuminated field for a considerable distance ahead of the reflector and at the same time be non-glaring. It is well known, that in a reflecting surface of revolution most of the reflected rays proceed from the portion in back of the focal plane, and the disturbing glare is largely due to these reflected rays. Therefore, in carrying out my invention, I provide two reflecting surfaces of revolution, each adapted to reflect rays of light from a source located in its focus, in a direction parallel to its axis; these surfaces are transversely truncated, that is to say, a portion of each is cut away on a plane at right angles to its axis, so that the vertex of one of the surfaces is removed and is replaced by the truncated portion of the other, the two parts being rigidly secured to each other, with their axes parallel but displaced, and with their focal planes coincident, and I place a source of light in the focus of the surface extending in front of the focal plane and therefore not in the focus of the reflecting surface in the rear of the focal plane.

My invention will be better understood from the following description when taken in connection with the accompanying drawings and its scope will be pointed out in the appended claims.

Figures 1, 2:
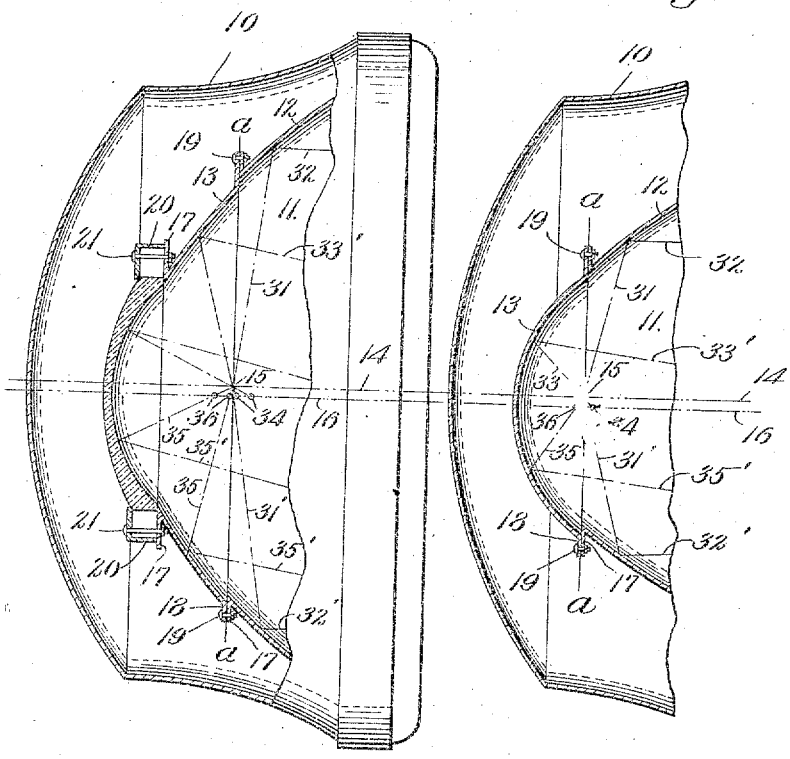
Figure 3:
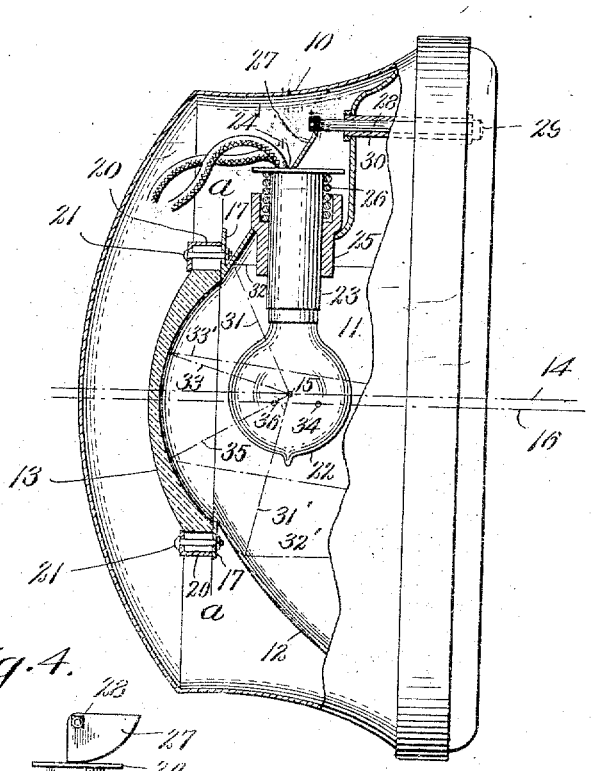
Figure 4:
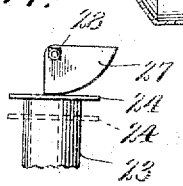

In the accompanying drawings, Figure 1 is a side elevation, partly in section and with parts broken away, of a headlight, having a reflector embodying my invention, with a light source and reflected rays indicated; Fig. 2 is a view similar to Fig. 1 illustrating another form which my reflector may assume; Fig. 3 is a view similar to Fig. 1 indicating another form of my reflector with an adjustable light and Fig. 4 is a front elevation of a detail of Fig. 3.

Referring to the drawings, the numeral 10 indicates a lamp casing, which may be of any conventional type, in which is suitably mounted a reflector 11. The reflector 11 is formed of two primary reflecting surfaces 12, 13, each adapted to direct beams parallel to its axis from a source of light placed in its focus. The surface 12 consists of the front portion of a parabolic reflector which has been cut on a line *a—a* perpendicular to its axis 14. Preferably this line passes through the focus, indicated at 15, as shown in Figs. 1 and 2, but in some cases, it is desirable to have the line *a—a* pass through the axis at a point located in back of the focus; this will be more fully described hereinafter with reference to Fig. 3. The surface 13 consists of the back portion of a parabolic reflector which has also been cut in a line perpendicular to its axis 16, corresponding to the line *a—a*. The back surface 13 is cut from the same parabola as the surface 12, as shown in Figs. 1 and 2. The back surface 13 may also be formed entirely of a Mangin mirror as shown in Fig. 3, or it may be a combination of a Mangin mirror and a parabolic reflecting surface as shown in Fig. 1.

When two parabolic reflecting surfaces are employed to form my reflector, as shown in Figs. 1 and 2, the surfaces 12 and 13 are provided with flanges 17 and 18 respectively and are rigidly secured to each other in any suitable manner, such as by bolts 19 through the flanges 17 and 18. These surfaces are secured together with their focal planes coincident and with their axes displaced but parallel, so that the axis 16 of the back reflecting surface 13 is below the axis 14 of the front reflecting surface 12.

When the back surface 13 consists entirely of a Mangin mirror, as shown in Fig. 3, the Mangin mirror is rigidly secured to the front surface 12, in any suitable manner, such as by clamps 20 and bolts 21 to the flange 17, with the focal plane of the surface 12 and that of the Mangin mirror, which here constitutes the surface 13, coincident and the axes of said surfaces displaced but parallel, so that the axis 16 of the Mangin mirror is below the axis 14 of the front surface 12 of the reflector. As hereinbefore pointed out, in this form of my invention, the front surface 12 is cut through its axis in back of the focal plane. This is done because it is found impractical to make or employ a Mangin mirror with a reflecting surface extended to its focal plane, and in order to avoid a gap between the front surface 12 and the Mangin mirror employed, when secured to each other. However when it is desired to shift the entire reflecting surface in back of the focal plane in a reflector in which a Mangin mirror is employed as an element of the back reflector, the surfaces 12 and 13 are cut through their focal planes and arranged as above described with reference to Fig. 2. In that case a Mangin mirror is secured to the back surface 13, in a manner similar to that described with reference to the surface 12 in Fig. 3, arranged with its axis coincident with the axis 16 of the back surface 13, as shown in Fig. 1.

A suitable source of light is located in the focus of the front reflecting surface 12 indicated at 15. I preferably employ an incandescent lamp having a concentrated filament, which may be suitably mounted within the casing in a fixed position as indicated diagrammatically at 15 in Figs. 1 and 2. However, I preferably employ an adjustable light source, movable in the focal plane, as shown in Fig. 3. In this arrangement, a bulb 22 is secured in a tubular socket member 23 having a flange 24 at one end. The socket 23 is loosely mounted in a supporting frame 25, which is counterbored at one end to accommodate a helical expansion spring 26. The spring 26 surrounds the socket 23 bearing against the frame 25 at one end and against the flange 24 at its opposite end and normally urges the bulb 22 upwardly toward the frame 25. This upward movement is limited by a cam surfaced stop 27 which is rigidly secured to one end of a pin 28 in any suitable manner. The pin 28 is provided with a screw head 29 at its opposite end extending out of the casing 10 and is loosely mounted in a sleeve 30 so that it may be rotated about its axis by means of the screw head 29 from outside of the casing. By rotating the pin 28, the cam surface of the stop 27 is caused to engage the flange 24 and move the socket 23 against the tension of the spring 26. In this manner, the light source may be moved in the focal plane and adjusted to the desired position.

Since a point source of light is not available, in order to illustrate the direction of the reflected rays of light it is convenient to regard the light source indicated by the numeral 15 as a point source. As this source is located in the focus of the front reflecting surface 12, any rays of light, say the rays 31, 31′, which strike this surface are reflected parallel to its axis 14, in accordance with well known laws governing reflection from parabolic surfaces, as indicated by the reflected rays 32, 32′. With reference to those rays striking the back surface 13, since its focus is below the focus of the front surface 12, and since the focal planes coincide, all rays of light from the source 15 striking the back surface are reflected downward.

In accordance with well known laws, rays from a light source in its focus are reflected from a Mangin mirror parallel to its axis. If the back surface is formed entirely of a Mangin mirror as shown in Fig. 3, or of a Mangin mirror and a parabolic surface with their axes coincident, as shown in Fig. 1, all reflected rays are directed downward. To illustrate, any ray directed upwardly, say the rays 33, striking the back surface 13, apparently come from a point 34 located on its axis 16 in front of the focal plane, and such rays are therefore directed downward, as indicated by the reflected rays 33′. Any ray directed downward from the source say the rays 35, pass through the axis 16 of the back reflecting surface 13, and apparently come from a point 36 on said axis in back of the focal plane, and such rays are also directed downward, as indicated by the reflected rays 35′.

It will thus be seen that in a lamp embodying the present invention, the light source is located at or substantially at the focus of the front reflecting surface of revolution, and that the rays which strike this surface are reflected parallel to its axis, and therefore can be used for distant lighting, that is, to produce an illuminated field for a considerable distance ahead of the reflector and at the same time be substantially non-glaring, inasmuch as the said rays form a concentrated beam having a relatively small angular divergence, which produces distant lighting with permissible or substantially no glare, whereas the rays which are reflected by the surface of revolution back of the light source, and to which heretofore the disturbing glare was largely due, are, by the non-coincident relation of the axis of said rear reflecting surface to the axis of the front reflecting surface of revolution, reflected downward and produce proximate lighting without glare.

In the present instance, the non-coincident relation of the axes of the front and rear reflecting surfaces of revolution is a fixed relation, which enables an inexpensive and highly efficient headlight to be made, which is capable of meeting the requirements of the authorities as to proper road illumination with respect to glare and to distant lighting, and which is available at a minimum cost to users of the inexpensive cars.

While I have described my invention as embodied in concrete forms in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A reflector comprising two transversely truncated reflecting surfaces of revolution secured together with their axes displaced but parallel, and with their focal planes coincident.

2. A reflector comprising two transversely truncated reflecting surfaces of revolution secured together one in front of the other with their axes displaced but parallel, and with their focal planes coincident, in combination with a source of light in the focus of the surface forming the front part of the reflector.

3. A reflector comprising a parabolic reflecting surface cut into two parts on a line perpendicular to its axis through the focus, a Mangin mirror fixed in and constituting an element of the part back of the focus, said parts being relatively displaced with the axis of a Mangin mirror and the axis of the part in front of the focus parallel.

4. A reflector comprising reflecting surfaces of revolution arranged on opposite sides of a common focal plane and bodily displaced vertically in relation to each other.

5. A reflector comprising reflecting surfaces of revolution arranged one in front of the other with their axes non-coincident and vertically displaced, in combination with a light source substantially at the focus of the front reflecting surface and in the focal plane of the other.

6. In combination, a lamp casing, a reflector located therein and having a front portion of a reflecting surface of revolution, a light source substantially at the focus of said front portion to cause the said portion to project a central distant lighting beam, and having another portion of a reflecting surface of revolution at the rear of said light source and bodily displaced with relation to the said front portion with its axis non-coincident with and below the axis of the said front portion to project its beam of light downward and obtain proximate lighting without glare.

CROMWELL A. B. HALVORSON, Jr.